F. G. BEETEM
MEANS FOR CONTROLLING THE CHARGE OF STORAGE BATTERIES
July 12, 1932. Original Filed July 25, 1930 Re. 18,516
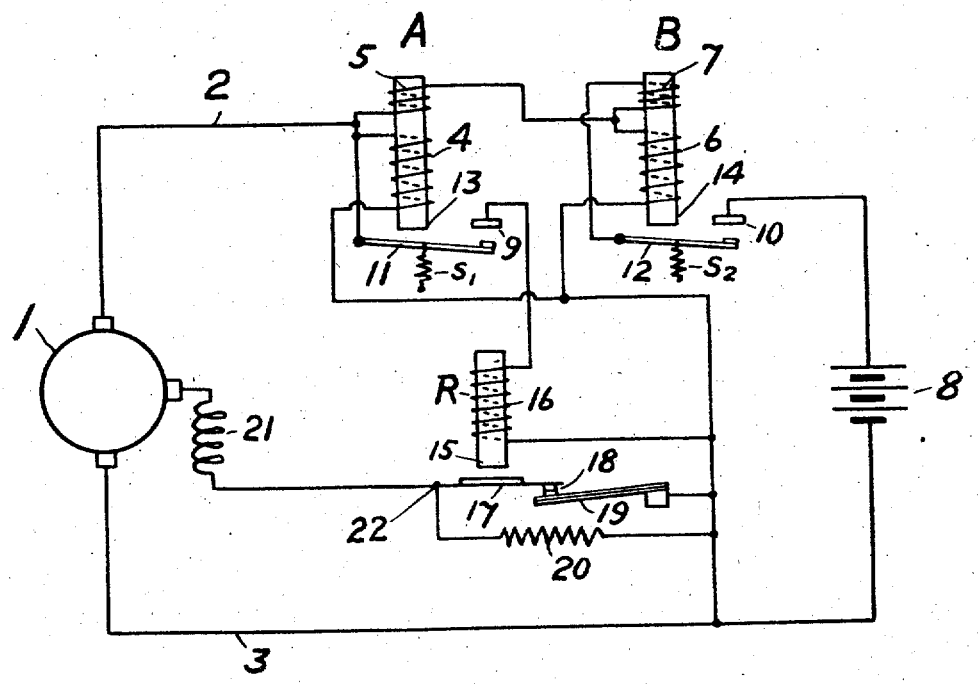
INVENTOR
Frank G. Beetem
BY
Augustus B. Stoughton
ATTORNEY.
WITNESS:
R. P. Kitchel.

Reissued July 12, 1932 Re. 18,516

UNITED STATES PATENT OFFICE

FRANK G. BEETEM, OF PHILADELPHIA, PENNSYLVANIA

MEANS FOR CONTROLLING THE CHARGE OF STORAGE BATTERIES

Original No. 1,833,349, dated November 24, 1931, Serial No. 470,696, filed July 25, 1930. Application for reissue filed December 30, 1931. Serial No. 584,005.

My invention applies to systems in which a storage battery is charged from a suitable generator at either of two charging rates, depending upon the battery voltage, the charging rate being reduced from the higher rate to the lower rate at a certain predetermined battery voltage. My invention is especially applicable to systems in which a charging generator is connected to the storage battery by means of an automatic switch or cut-out designed to close when the generator voltage reaches a certain value and to open again when the generator voltage drops to some lower value.

An object of my invention is to provide a voltage responsive relay adapted to reduce the charging rate from the higher value to the lower value and to provide means whereby the exciting coil of this relay is disconnected until after the generator is connected to the battery by means of the automatic switch. Other objects of the invention are to provide apparatus for carrying out the desired objects which shall be simple in construction, inexpensive to manufacture and reliable in operation. My invention will be more clearly understood by reference to the accompanying drawing in which is shown diagrammatically a system disclosing one embodiment of my invention applied to a combination of battery and charging generator, the latter of the third brush type such as is generally employed for starting and lighting systems on automobiles.

In the drawing, 1 is a charging generator of the third brush type connected to the circuit 2, 3, its field coil being shown at 21. This field coil is connected between the third brush of the machine and the conductor 3 through a fixed resistor 20. The resistor 20 is normally short circuited through the contacts 18 of the voltage responsive relay R, which is provided with a magnetic core 15 and an armature 17 pivoted at 22. The core 15 is provided with an exciting coil 16 connected across the circuit 2, 3 through the contacts 9 of the relay A. The contact 18 mounted on the armature 17 makes contact with a bimetallic strip 19 so arranged that at higher temperatures the free end of this bimetallic strip rises, moving the armature 17 nearer to the core 15, thus reducing the air gap and causing the armature to be attracted into its upper position to break the contact 18 at a lower voltage than that required when the temperature is low.

The closing of the contacts 9 of the relay A is determined by the combined action of the voltage coil 4 connected directly across the circuit 2, 3, and the series coil 5 which carries the current delivered from the generator to the battery when the contacts 10 of the automatic switch B are closed.

The automatic switch B is of the well known type, having a core 14, a shunt coil 6 and a series coil 7. The shunt coil 6 is connected across the circuit 2, 3, and when the generator reaches the voltage for which the automatic switch or cut-out B is adjusted, the excitation of the coil 6 is sufficient to lift the armature 12 against the force exerted by spring $S_2$ and close the contacts at 10, connecting the generator 1 to the battery 8.

Referring again to the relay A, the adjustment of the relay A and the automatic switch B is such that the excitation of the coil 6 on the switch B will always close the contacts 10 before the excitation of the coil 4 on the relay A is sufficient to close the contacts 9. After the contacts 10 are closed, current will flow from the generator 1 to the battery 8 through the series coil 5 of relay A, and the excitation of this coil added to that of coil 4 will be sufficient to close the contacts 9, thus completing the circuit of the exciting coil 16 of relay R. At the begining of the charging period, the voltage across the circuit 2, 3 will not be sufficient to cause the relay R to lift the armature 17 and open the contacts at 18. As the battery becomes more fully charged, the voltage will rise until at a certain predetermined voltage the contacts 18 will be opened and the charging rate reduced by the insertion of the resistance 20 in series with the field coil 21.

The object of the arrangement shown in this drawing may be explained as follows:

It is desirable to connect the coil 16 on the generator side of the automatic switch B so that when the generator is not in operation and the automatic switch is open, the coil 16 will be disconnected from the battery and will not constitute a continuous drain of current from the battery when the generator is idle. However, when the coil 16 is connected across the generator, the generator voltage may rise to an excessive value sufficient to attract the armature 17 and open the contacts at 18 before the automatic switch B is closed. This will start the charging of the battery at the low rate instead of the high rate whereas it is always desirable to start the charge at the higher rate. In order to avoid this difficulty, the relay A has been introduced and so designed that the circuit of the coil 16 cannot be closed until after the automatic switch B has closed. As soon as the automatic switch B closes, the voltage of the generator will drop to that of the battery, and as explained above, this voltage will not be sufficient to actuate the relay R until the battery charge has been nearly completed.

It will be noted that the relays A and B are similar in construction and performance and in fact they may be identical in design except for a slight difference in adjustment to insure that the switch B will close before the switch A. By making these two switches identical, the cost of production is materially reduced.

Having described one embodiment of my invention, what I claim and desire to secure by Letters Patent is:

1. In combination, a storage battery, a generator and its circuit including a voltage responsive exciting coil adapted to be connected across said generator for adjusting the charging rate to the battery selectively at either a higher or a lower value, an automatic switch for connecting the generator to the battery, a relay adapted to control the adjusting means, said relay having a voltage responsive exciting coil, and means for connecting said coil to the circuit between the generator and the automatic switch only after said automatic switch has closed.

2. A charging apparatus for batteries including in combination, a third brush generator, a battery adapted to be connected to two of the brushes of the generator, a field coil for said generator connected to the third brush of the generator, a fixed resistor connected in series with said field coil between said third brush and one of the other brushes of the generator, a connection in parallel with said resistor containing an armature and a bimetallic thermal responsive element, cooperating contacts on said armature and on said bimetallic element, a coil controlling said armature and adapted to be connected across said battery, a switch in series with said coil, a second coil connected across said battery and controlling said switch, and an automatic switch connected between said last mentioned switch and said battery, said automatic switch being adjusted to close before said first mentioned switch closes.

3. In combination, a storage battery, a charging generator, an automatic switch adapted to connect the generator to the battery at a predetermined generator voltage, means including a voltage responsive exciting coil for adjusting the generator field excitation selectively at either a higher or a lower value, and a relay having an exciting coil in series with the generator output and adapted to connect said voltage responsive exciting coil across the generator in response to a flow of current from said generator.

4. In combination, a storage battery, a charging generator, an automatic switch adapted to connect the generator to the battery at a predetermined generator voltage, means including a voltage responsive exciting coil for adjusting the generator output selectively at either a higher or a lower value, and a relay having an exciting coil in series with the generator output and adapted to connect said voltage responsive exciting coil across the generator in response to a flow of current from said generator.

FRANK G. BEETEM.